United States Patent [19]

Odle

[11] Patent Number: 5,491,511
[45] Date of Patent: Feb. 13, 1996

[54] MULTIMEDIA CAPTURE AND AUDIT SYSTEM FOR A VIDEO SURVEILLANCE NETWORK

[76] Inventor: James A. Odle, Rte. 1, Box 127, Lake Norden, S. Dak. 57248

[21] Appl. No.: 191,491

[22] Filed: Feb. 4, 1994

[51] Int. Cl.$^6$ .................................................... H04N 7/18
[52] U.S. Cl. ............................................ 348/153; 358/423
[58] Field of Search .................................. 348/143, 152, 348/153, 154, 423; H04N 7/18

[56] References Cited

U.S. PATENT DOCUMENTS

| | | | |
|---|---|---|---|
| 4,510,526 | 4/1985 | Coutta | 348/143 |
| 5,202,759 | 4/1993 | Laycock | 348/152 |

*Primary Examiner*—Howard W. Britton
*Attorney, Agent, or Firm*—Patterson & Keough

[57] ABSTRACT

A multimedia capture and audit system for a video surveillance network provides a tamper resistant and easily reviewable record of each transaction monitored. The system stores a digital record of each physical transaction registered by an electronic device in a standard predefined database format and stores a separate mixed composite video signal containing both a visual record and digital record of each transaction. The separately stored digital record and mixed composite video signal are correlated through the use of a unique system pointer. In the preferred embodiment, the unique system pointer identifies, at a minimum, the electronic device which registered the physical transaction and the date and time of the transaction. Storage of both a mixed composite video signal and digital record makes it difficult to tamper with the transaction record while maintaining a record of each transaction in a digital format provides operators the ability to compile and analyze data for audit purposes. Use of the unique system pointer makes it easy to identify and view the portion of the mixed composite video signal which corresponds to any digital record that may be flagged as of interest in an audit.

10 Claims, 11 Drawing Sheets

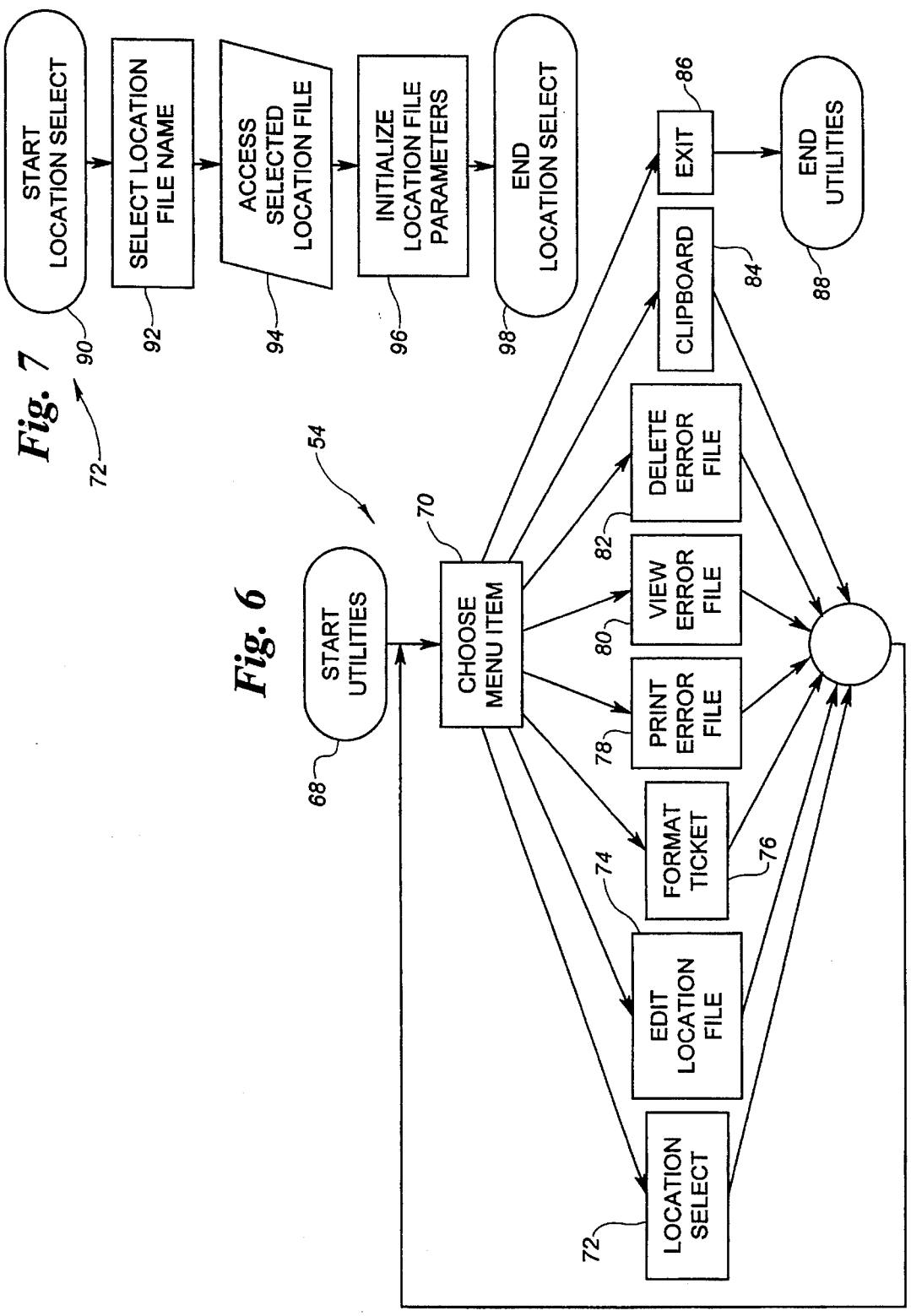

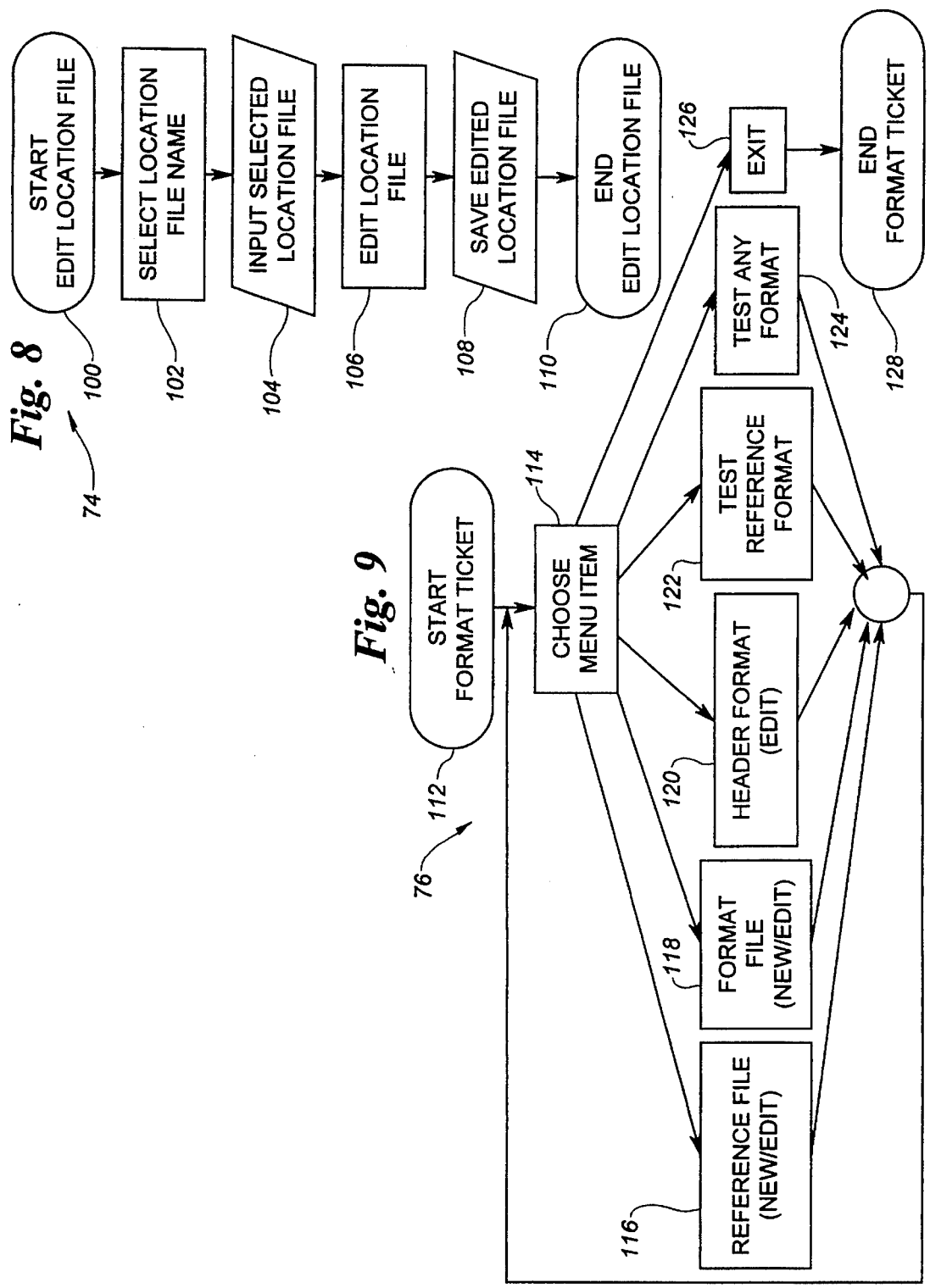

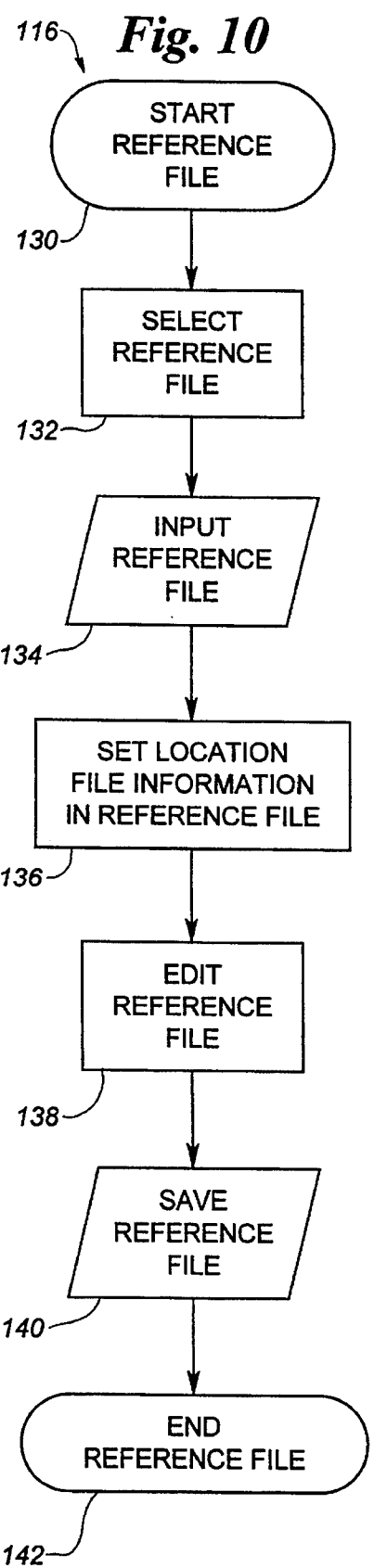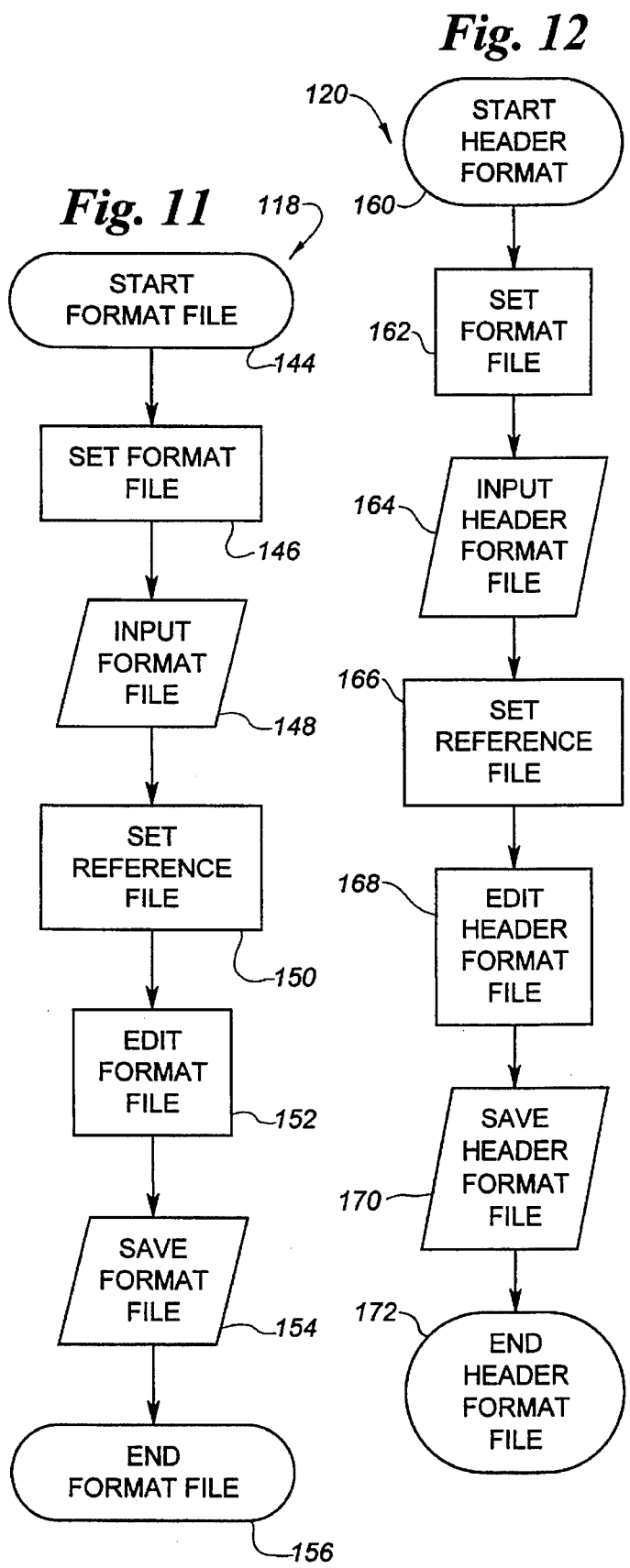

5,491,511

MULTIMEDIA CAPTURE AND AUDIT SYSTEM FOR A VIDEO SURVEILLANCE NETWORK

TECHNICAL FIELD

The present invention broadly relates to point-of-sale surveillance systems. More specifically, the present invention relates to a method and apparatus for the capture, storage and retrieval of visual and digitized information in a video surveillance network.

BACKGROUND OF THE INVENTION

Visual surveillance via cameras or closed circuit televisions systems is well known in the art as demonstrated by, for example, U.S. Pat. No. 5,216,502 (Katz). These systems have enabled visual records to be stored on videotape for later analysis. However, because of the amount of information recorded, it is difficult to review all the information and identify patterns, such as patterns of employee theft. Employee theft most often occurs at the point-of-sale, for example, at a cash register or at a bank teller's station. and can be identified by observing transactions that fall outside normal activity.

Current video surveillance systems typically record transaction activity with two types of transaction information: a video signal for visual information and digital data to reflect each transaction as it is entered into the point-of-sale device, such as a cash register or bank teller register. In the past, one method of storing this information has been to overlay the digital data on the video signal and record and store both types of information together as a mixed composite video signal. Representative of such systems are the surveillance systems disclosed in U.S. Pat. No. 4,120,004 (Coutta), U.S. Pat. No. 4,922,339 (Stout), and U.S. Pat. No. 4,991,008 (Nama). Wile this type of combined video record is not easily tampered with, the problem with this method is that there is a tremendous volume of information which must be manually reviewed in order to identify patterns of unwanted or criminal activity.

Another method for storing the visual and digital information has been to use the digital data as the leading information or header for the video signal as described in U.S. Pat. Nos. 4,237,483 and 4,145,715 (Clever patents). This merger of information, however, tends to degrade the quality of the video image and still requires that an operator scan all the information in its entirety to identify problem areas. Use of these system with a plurality of cameras requires additional cabling installed in order to coordinate the operation of all cameras in sync with each other. In addition, because much of the digital information is stored separately from the video images, this information is vulnerable to tampering by dishonest store managers, for example.

A third and more recent method is to store the digital data in the audio portion of the video signal and to mark transactions of interest with an alarm signal in the audio track. One example of such a system is disclosed by U.S. Pat. No. 5,216,502 (Katz). This method reduces the amount of material an operator must scan by allowing the operator to move quickly to those portions of the videotape which are marked by the audio alarm. Nonetheless, this method requires that all transactions of interest be previously marked. If transactions of interest are not marked, the operator still must scan all the transaction to find the transaction of interest. In addition, this third method does not provide any easy way for an operator to identify patterns and trends outside of a relatively small group of preselected conditions which cause an alarm signal to be recorded.

One solution to the problem of viewing irrelevant information is to record only those transactions of interest such as is done by the System 500 or System 1000 sold by Video Controls Limited of 1 Aston Fields Road, Whitehouse Industrial, England or the Sensormatic Electronics Corporation POS/EM system sold by Sensormatic of Deerfield, Beach, Fla. The Video Controls system records user-defined events, such as void transactions, through its closed circuit TV and provides a summary videotape of particular events with the details of the cash register transaction superimposed over the videotape picture. One problem is that the system records only those events that the user predefines as important. Thus, critical transactions which are not of prior interest may be lost. For example, often events, such as void transactions, merely point to a larger pattern of theft. This pattern of theft often is evident only by viewing several entries or transactions prior to the void transaction.

The Sensormatic Electronics Corporation POS/EM system automatically aims a camera at the register once a pre-defined exception to normal cash register transactions is detected in the electronic cash register. The Sensormatics Electronics Corporation POS/EM system then displays the cash register transaction data on the video picture. The problem here is that, because the camera is triggered only after an exception is detected in the electronic cash register data, the camera may not record the actual event leading to the loss. Such a time delay, even a small one, may not record the key activity. Again, separate storage of the visual picture data and digital data opens the system to tampering.

In sum, a multimedia capture and audit system for a video surveillance network that captured all relevant information and stored that information in a tamper-resistant form and offered improved review and audit capabilities would be greatly appreciated.

SUMMARY OF THE INVENTION

The present invention provides a method and apparatus for a multimedia capture and audit system for a video surveillance network which provides a tamper resistant and easily reviewable record of each transaction monitored. A mixed composite video signal containing both a visual record and digital record of each transaction is stored as well as a digital record. The digital record and mixed composite video signal for each transaction are correlated through use of a unique system pointer. In the preferred embodiment, the unique system pointer identifies the transaction device and the date and time of the transaction. Use of both a video record and digital record makes it difficult to tamper with the transaction record and discourages unauthorized access. Maintaining a record of each transaction in a digital format provides operators the ability to correlate data in almost unlimited relationships for audit purposes. Use of the unique system pointer makes it easy to identify and view the portion of the mixed composite video signal which corresponds to any digital record.

The multimedia capture and audit system broadly includes means for capturing occurrences of digital transaction data from each of the electronic transaction devices, video memory means for storing the video signals and digital memory means for storing the digital transaction data in a database separately from the video memory means, control means operably coupled to the capture means and each of the memory means for storing, in response to an occurrence of digital transaction data, a mixed composite video signal on the video memory means using a unique system pointer and for storing the digital transaction data and the unique system pointer in the database on the digital memory means and audit means operably coupled to the memory means for auditing the transactions by analyzing the database stored in the digital memory to identify transactions of operator interest and reviewing the mixed composite video signal of the corresponding transaction stored in the video memory means by correlation of the unique system pointer.

BRIEF DESCRIPTION OF THE DRAWINGS

FIG. 6 shows the Utilities step of FIG. 5 in greater detail;

FIG. 7 shows the Location Select step of FIG. 6 in greater detail;

FIG. 8 shows the Edit Location File step of FIG. 6 in greater detail;

FIG. 9 shows the Format Ticket step of FIG. 6 in greater detail;

FIG. 10 shows the Reference File step of FIG. 9 in greater detail;

FIG. 11 shows the Format File step of FIG. 9 in greater detail;

FIG. 12 shows the Format Header File step of FIG. 9 in greater detail;

DETAILED DESCRIPTION OF THE PREFERRED EMBODIMENT

Figure 1:
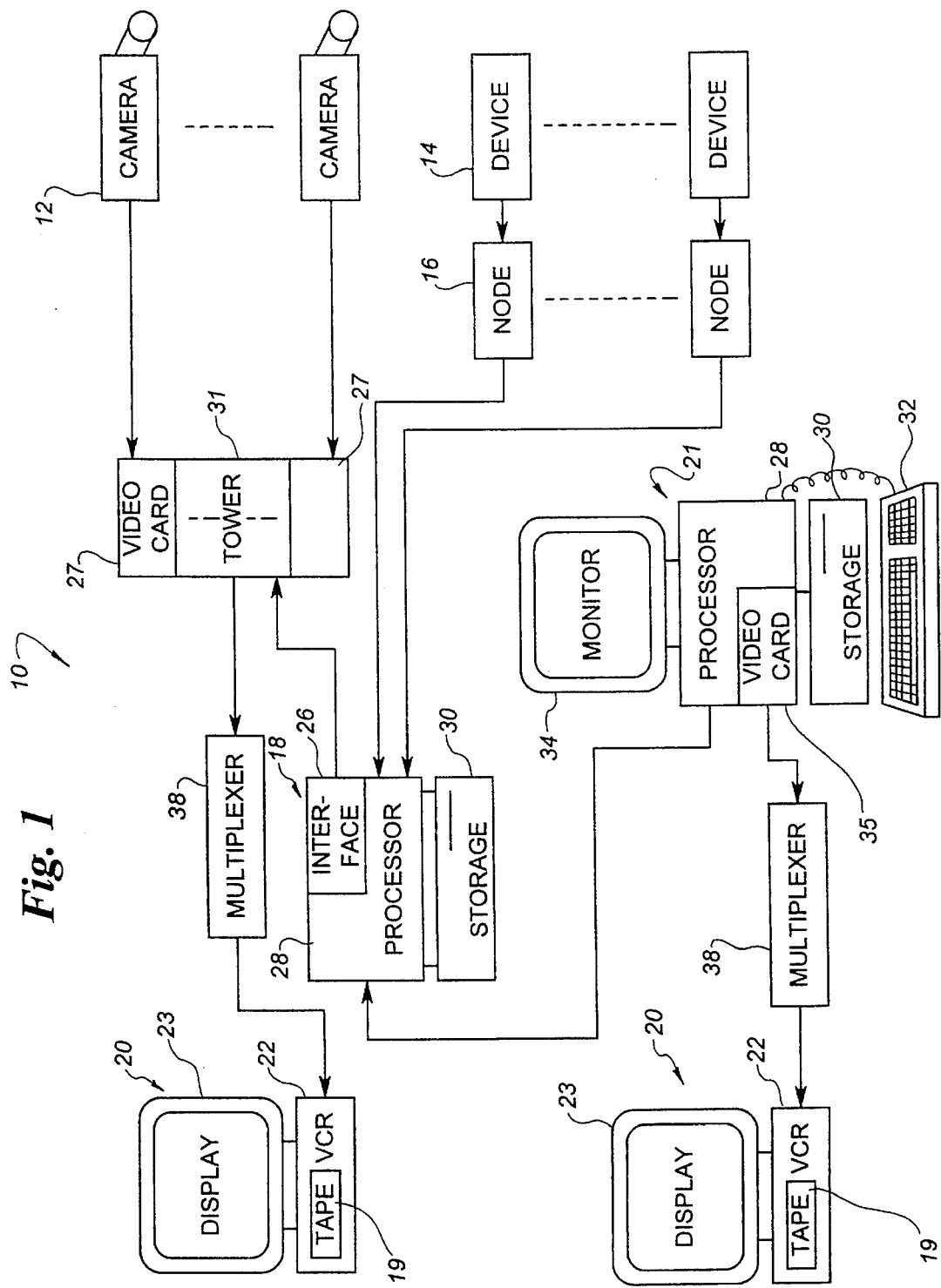
FIG. 1 depicts a schematic diagram of a multimedia surveillance and audit system in a point-of-sale environment in accordance with the present invention.

Reference is now made to the drawings, wherein like reference numerals denote like elements throughout the several views. Referring to FIG. 1, one embodiment of a multimedia capture and audit system 10 broadly includes video input unit 12, electronic transaction device 14, node 16, system controller unit 18, video storage system 20 and audit controller system 21.

In the first embodiment depicted in FIG. 1, the video input unit 12 is a camera generating a camera composite video signal. The video storage system 20 includes a videotape 19, video cassette recorder (VCR) 22 and video display 23. In the preferred embodiment, the VCR is a Panasonic AG 6040 VCR or a Panasonic AG 6730 VCR. Those skilled in the art will understand that the video storage system 20 may be a CD-ROM player and CD-ROM disc that stores a digital optical signal to represent the visual picture of the transaction.

The electronic transaction device 14 may be a cash register, an automated teller machine (ATM), a bank teller cash drawer, a bar code reader or any other device that generates digital data. It will be understood by those skilled in the art that the device 14 may be a link to another network of devices such that the devices 14 in the other network alternate sending digital data through the node 16. In addition, device 14 may be from various manufacturers, such as, for example, cash registers manufactured by NCR or IBM.

The node 16 is operably attached to device 14 and the system controller unit 18 and includes node processor means 24. In the preferred embodiment, the node processor means 24 is any microcontroller and associated circuitry, such as, for example, an IBM PC '286, '386 or '486 machine or a computer system based on the Intel 8050 series processor, that is capable of converting the native digital data of device 14 into a human readable form and including identifying information as a header.

System controller 18 includes video interface 26, a plurality of video cards 27, system processor 28, random access memory (RAM) (not shown), system clock (not shown) and digital data storage 30. In the first embodiment, system controller 18 is an IBM PC '486 computer system with at least 80 MB of hard drive storage and 2 MB RAM. In the preferred embodiment, video cards 27 are housed in a tower 31 and each of the video cards 27 is operably coupled to a video input unit 12. In the preferred embodiment, each video card 27 processes video signals from a single video input unit 12 and is designed for mounting in a video card tower 31. Those skilled in the art will understand that the particular configuration of system controller 18 may vary. For example, microcomputer systems, other than those manufactured by IBM may be used. The size and type of digital storage device may include larger hard drive systems, tape drive systems or CD-ROM systems.

System controller 18 is operably coupled to video input unit 12 via a video card 27 and is operably coupled to node 16 and video storage system 20. The actual connections are those common in the art, using cables into the respective port of each machine. It will be understood by those skilled in the art that the system controller 18 may be remotely coupled to the node 16 by a variety of mechanisms common in the field, such as, a modem or network link or direct leased telephone line.

Audit controller 21 includes a system processor 28, random access memory (RAM) (not shown), digital data storage 30, user input device 32, monitor 34 and an internal video card 35. In the preferred embodiment, audit controller 21 is an IBM PC '486 computer system with internal VGA card, attached keyboard, color monitor and at least 80 MB of hard drive storage and 2 MB RAM. The user input device 32 may be a touchscreen, light pen or voice microphone. The monitor 34 may be monochrome or may vary in size. Alternately, audit controller 21 also may include a printer as an output device.

In the preferred embodiment, the audit controller 21 is operably coupled to system controller 18 via a modem.

Those skilled in the art will understand that audit controller 21 may also be remotely coupled to system controller 18 via a variety of mechanisms common in the field, such as, a network link, direct leased telephone line or satellite communications. Typically, audit controller 21 is located at a district office or centralized store or bank management office at a site remote from system controller 18. It will also be understood by those skilled in the art that system controller 18 and audit controller 21 may be the same computer system or may be housed in the same machine.

Figure 2:
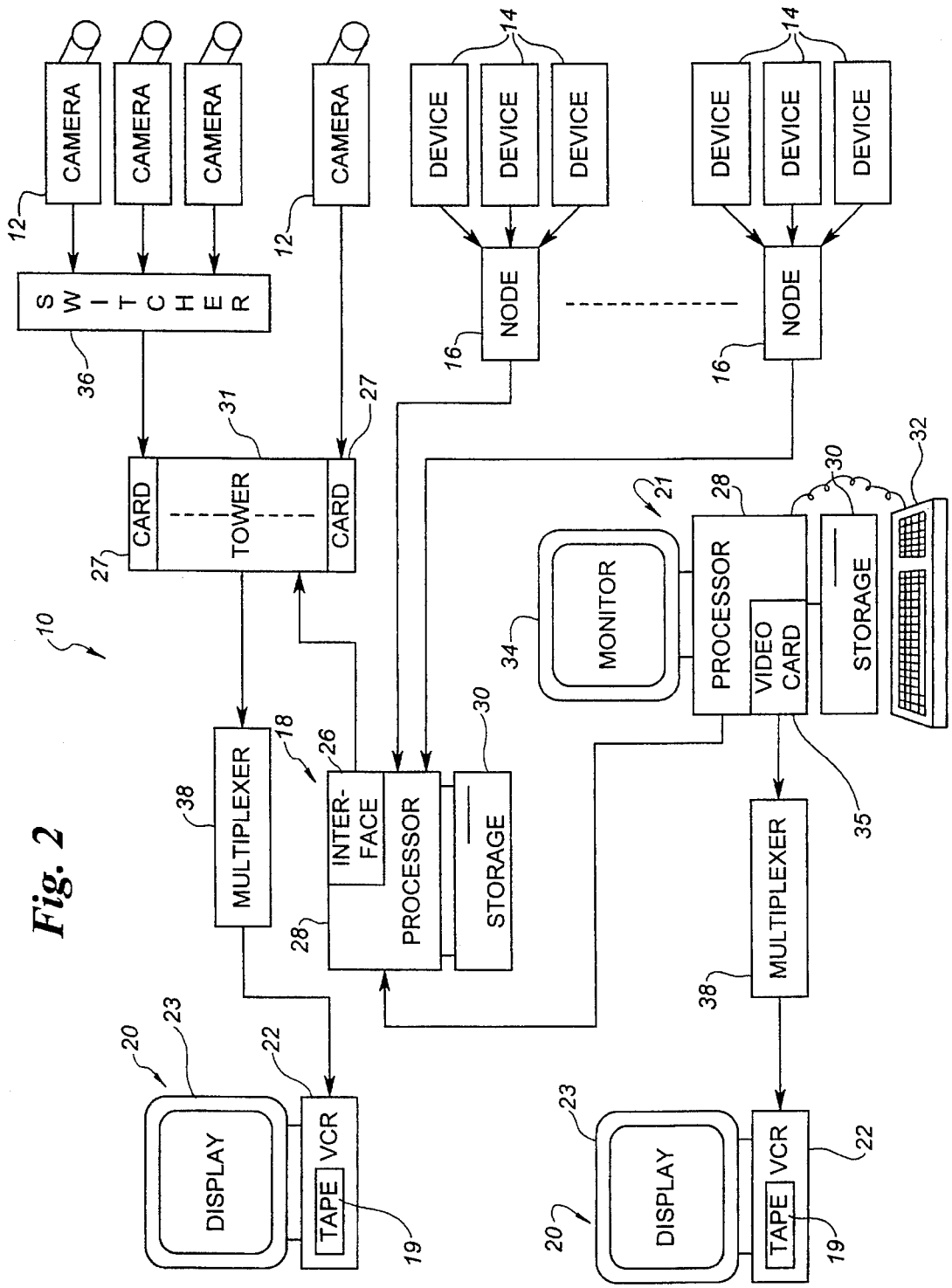
FIG. 2 depicts a schematic diagram of an alternate embodiment of a multimedia surveillance and audit system with multiple point-of-sale devices.

In a second embodiment depicted in FIG. 2, the camera composite video signal is generated from a plurality of video input units 12, e.g. cameras, coupled together through a video input switcher 36 to video cards 27. Those skilled in the art will understand that the switcher 36 may also be a dome-type camera control device.

A plurality of electronic transaction devices 14 are operably coupled to node 16, called a "polynode." The polynode 16 may couple a variety of devices 14 of different manufacture or the same manufacture on a single polynode 16. In the current embodiment, the polynode 16 is serially connected to the system controller 18 over an optically isolated serial port that uses a central polling scheme to implement a variety of network topologies. Thus, the polynode 16 may accommodate up to thirty-two different devices 14 or more than thirty-two devices may be coupled to polynode 16 if some or all of the devices 14 act as link devices to other networks.

The video storage system 20 includes a videotape 19, a video cassette recorder (VCR) 22 and video display 23 as in FIG. 1 and a video multiplexer 38 to alternate storage of composite video signals generated by different cameras on the same videotape. Video multiplexer 38 may be of any of a number of different video multiplexer systems as are known in the art, such as Robot MV90 series.

In operation, referring to FIGS. 1, 2 and 3A–C and following the data stream, device 14 generates digital data to record a transaction. A transaction may be defined as a single line of information or may be defined as a group of lines. For example, if device 14 is a cash register, a transaction may be defined as each line on a customer's receipt, such as "1 dz. eggs 0.65" or may be defined as all the information in a ticket. Typically, the ticket is the customer's receipt. For example, in a retail environment, the customer's sales receipt is the ticket. In a banking environment, the deposit or withdrawal or funds transfer record is the ticket. Simultaneously, the entry of this transaction by the employee is recorded visually by video input unit 12 such as an overhead camera.

The digital data from device 14 is sent to the node 16 in the data format native to device 14. The node 16 converts the native or raw digital data into a first digital data format, shown in FIG. 3A. In the first digital data format, the raw digital data is converted to a human readable form, such as ASCII code, a source identifier is added and the data is encrypted for secure transmission to system controller 18. The source identifier, at a minimum, identifies device 14 from which the transaction originated. Alternately, node 16 may be initialized to be in sync with the system clock of system controller 18 and the node 16 may add system date and time information to the source identifier.

Figure 3A:
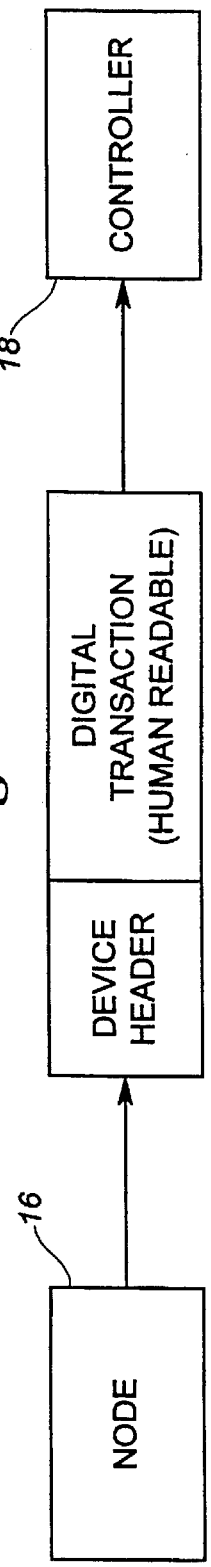
FIG. 3A depicts a block diagram of the format of digital data as it flows from the node to the system controller.
Figure 3B:
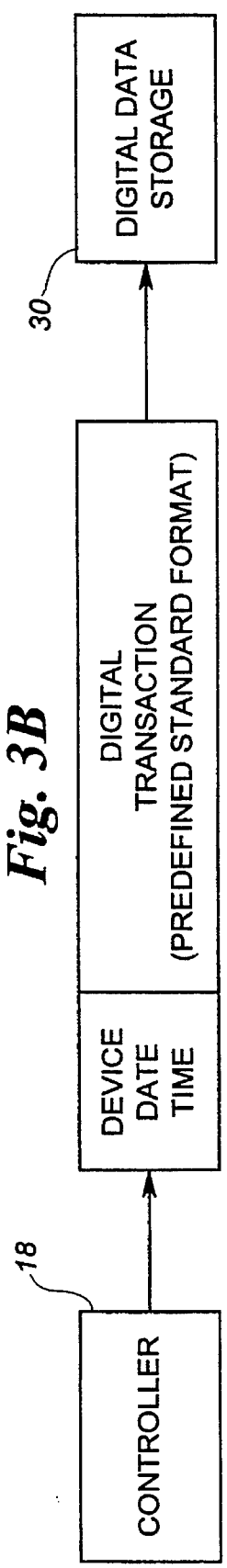
FIG. 3B depicts a block diagram of the digital data as it flows from the system controller to the digital data storage.
Figure 3C:
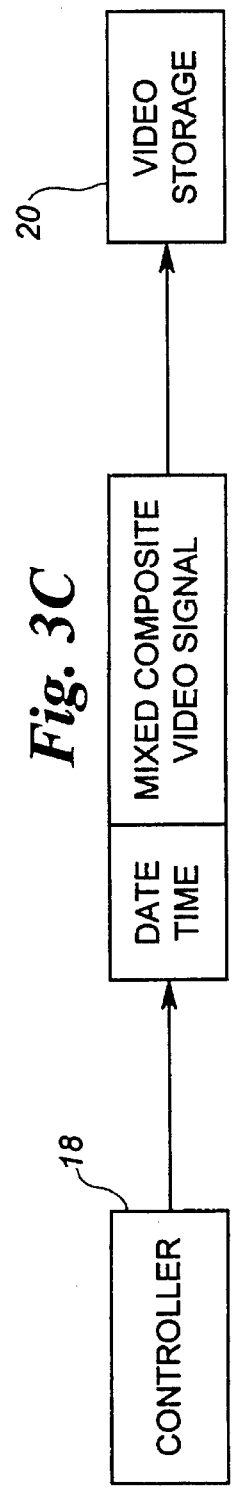
FIG. 3C depicts a block diagram of the stored mixed composite video signal.
Figure 4:
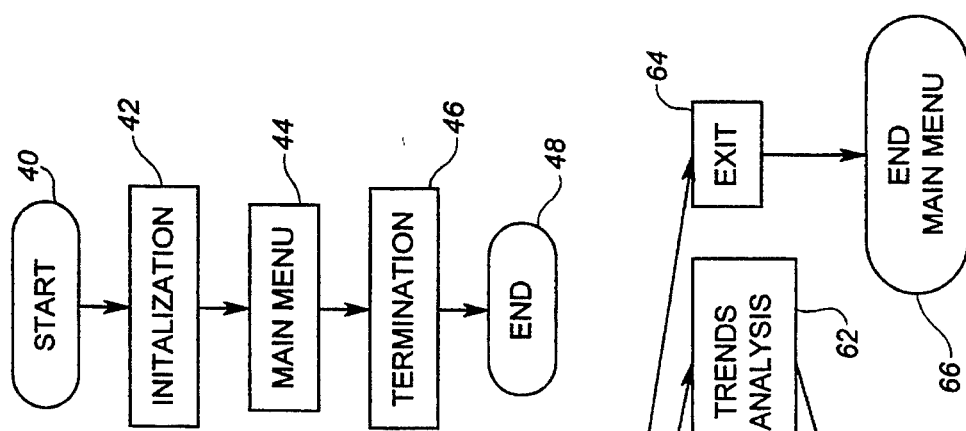
FIG. 4 presents a flowchart depicting the overall method of the present invention.

Upon receipt of a data transaction from node 16, system controller 18 deciphers the first digital data format and converts the human readable digital data into a predefined common standard format, or second digital data format, shown in FIG. 3B, for storage in a database. Use of a predefined common standard format ensures that although the digital data may be generated by devices 14 of different manufacturers, all the digital data will be organized in a similar fashion. For example, if the devices 14 are cash registers, one type of cash register may organize its transactions with leading zeros before each dollar amount and use the code V for void. Another type of cash register may remove leading zeros before each dollar amount and generate the code VD for voids. The predefined format standardizes the organization and storage of similar information from devices 14 of different manufacturers. The format also includes information about device 14 from which the transaction originated. With this information, any re-display of a particular transaction can be re-converted to reflect the original format of transactions for that device 14. Use of the predefined format improves the accuracy and completeness of reports totaling or summarizing activity for a plurality of devices 14 of different manufacturers. Once such information is stored in the predefined format, the information may be easily accessed for use in an electronic journaling or inventory control system.

The video input device 12 automatically records a visual record of each transaction as a camera composite video signal. The camera composite video signal is sent to a video card 27. The video card 27 also receives a copy of the transaction data in the first digital format which is stored in video RAM (not shown) of video card 27. Video card 27 continuously merges the stored digital transaction data with the corresponding camera composite video signal to create a mixed composite video signal, shown in FIG. 3C, such that if no transaction data is in the video RAM at a given time, the mixed composite video signal carries just the camera composite video signal. The mixed composite video signal combines the camera composite video signal and digital transaction data into a single signal for storage on the video storage system 20.

Once combined, the mixed composite video signal is sent to the video storage system 20 to be saved. The VCR 22 stores the mixed composite video signal on the videotape 19 with a non-displayable date and time stamp generated by the VCR 22. For ease of retrieval of this signal, in the preferred embodiment, system controller 18 initializes VCR 22 at least every 24 hours to correlate the internal VCR clock (not shown) of VCR 22 to the system clock of system controller 18.

To audit or review one or more transactions, audit controller 21 uploads the digital transaction data stored by system controller 18 to its digital data storage 30 and identifies the transaction to be viewed according to user-defined criteria entered via user input device 32. The identified transaction is displayed on monitor 34. Audit controller 21 uses a system pointer to identify the portion of the videotape 19 which stores the desired transaction in a mixed composite video signal. In the preferred embodiment, the system pointer is calculated from the system clock (not shown) of system controller 18. Those skilled in the art will understand that the system pointer may be calculated from other timing mechanisms internal to system controller 18.

In the preferred embodiment, audit controller 21 instructs VCR 22 to locate the portion of videotape 19 in which the date and time stamp generated by VCR 22 for a given camera most nearly matches the date and time stamp stored for that transaction as digital data. That portion of the videotape 19 is then displayed on video display 23. Because a visual record of a transaction occurs over several videotape frames, correlation of the local VCR date and time stamp to the system pointer provides sufficient accuracy to locate a given transaction. Nonetheless, it will be understood that, given a highly accurate VCR clock, the local VCR date and time stamp would have the same values as the system pointer.

It will be understood that a videotape 19 storing a mixed composite signal received from video card 27 can be removed from VCR 22, mailed to a central location and reviewed on a different VCR 22 as is shown operably coupled to audit controller 21 or, the videotape 19 may be accessed by playing on-site, i.e. on VCR 22 which is operably coupled to system controller 18.

One of the primary advantages of the present invention is that storage and retrieval of the mixed composite video signal and digital transaction data separately make it difficult for anyone to tamper with a transaction record. In order to tamper, a dishonest person must alter both a containing a visual record of the transaction with a digital record stored in a mixed composite video signal and a second record of the transaction stored as digital data in a predefined database format. By having both the signal and digital transaction data recorded separately, but uniquely interrelated by a system pointer, the present invention avoids the problems of prior systems that stored true composite signals in that the tremendous volume of video information will not need to be reviewed in order to isolate transactions that are of interest.

Referring to FIG. 2, when there are a plurality of video input units 12, system controller 18 records the particular video input unit 12 generating each camera composite video signal through coordination with the video input switcher 36. When storing a plurality of mixed composite video signals, system controller 18 controls and coordinates the multiplexer 38 and VCR 22 to ensure that each mixed signal is uniquely identifiable on videotape 19.

Referring to FIGS. 4–16 and following an operator's use of a multimedia capture and audit system 10 in accordance with the present invention, an operator first activates the system 10 (step 40) and audit controller 21 performs initialization sequence (step 42), main menu process (step 44), termination process (step 46) and ends (step 48).

During the initialization sequence (step 42), audit controller 21 initializes a pass file containing information identifying the last transactions and reports the user accessed.

Figure 5:
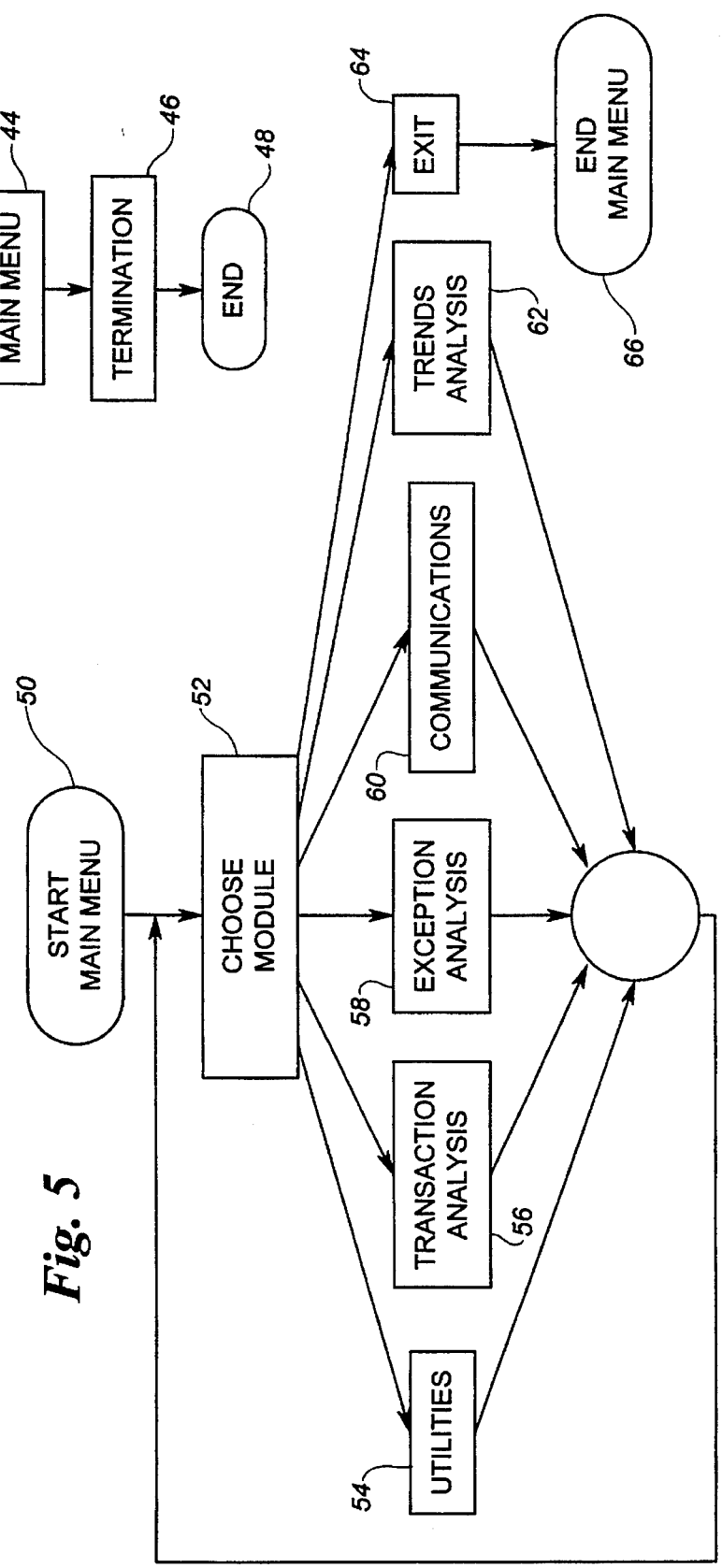
FIG. 5 shows the Main Menu step of FIG. 4 in greater detail.

Referring to FIG. 5, audit controller 21 initiates the Main Menu process (step 50) by asking the operator to input their choice of functions to perform (step 52 Choose Module). The choice of functions includes, at least, the following: Utilities (step 54), Transaction Analysis (step 56), Exception Analysis (step 58), Communications (step 60), Trends Analysis (step 62) and Exit (step 64). If the operator chooses Exit (step 64), audit controller 21 ends the Main Menu process (step 66) and initiates the Termination process (step 46 of FIG. 4).

Referring to FIG. 6, audit controller 21 initiates Utilities (step 54 of FIG. 5) by asking the operator to input a choice of Utilities functions to perform (steps 68 and 70 Choose Menu Item). The choice of functions includes, at least, the following: Location Select (step 72), Edit Location File (step 74), Format Ticket (step 76), Print Error File (step 78), View Error File (step 80), Delete Error File (step 82), Clipboard (step 84) and Exit (step 86). If the operator chooses Exit (step 86), audit controller 21 ends Utilities process (step 88) and initiates Choose Module step (step 52 of FIG. 5).

Referring to FIG. 7, if the operator chooses the Location Select function (step 72 of FIG. 6), audit controller 21 initiates the Location Select procedure (step 90) and requests that operator select the appropriate location file by choosing the appropriate file name (step 92). The location file contains values representing the correct digital data storage location for files related to transactions occurring on the same device. In the preferred embodiment, the location file contains directory path control information and is used to select the correct directory path to save or read files related to transactions occurring on the same device. For example, the location file includes the directory location path, description of the device(s) 14 in the path, the identifier for the corresponding format file, the name of the device(s), a telephone number, a block size for transfer of the data, a unit number (often used to identify the store location of the device(s)), connection type, such as direct or modem, for transferring data, audit controller 21 connection port identifier for the transfer mechanism such as a modem, the VCR port identifier for the connection to audit controller 21, a camera multiplexer port identifier and a modem command line.

Audit controller 21 accesses the selected location file from digital data storage 30 (step 94) and initializes the location file (step 96) by reading the location file information into its random access memory (step 96). Next, audit controller 21 ends the Location Selection procedure (step 98) and returns to Choose Menu Item step (step 70) of FIG. 6.

Referring to FIG. 8, if the operator chooses Edit Location File function (step 74 of FIG. 6), audit controller 21 initiates Edit Location File procedure (step 100) and requests that operator select the appropriate location file by choosing the appropriate file name (step 102). Audit controller 21 accesses the selected location file from digital data storage 30 and inputs the selected location file into its random access memory (step 104). Next, audit controller 21 displays the location file parameters to the operator and accepts new or changed values for location file parameters within a predefined range of acceptable values (step 106). Once the operator has completed the entry of new or changed values, audit controller 21 saves the edited location file to the hard drive storage 30 (step 108). Audit controller 21 ends the Edit Location File procedure (step 110) and returns to Choose Menu Item step (step 70) of FIG. 6.

Referring to FIG. 9, audit controller 21 initiates Format Ticket (step 76 of FIG. 6) by asking the operator to input a choice of Format Ticket functions to perform (steps 112 and 114 Choose Menu Item). The choice of functions includes, at least, the following: Reference File (step 116), Format File (step 118), Header Format (step 120), Test Reference Format (step 122), Test Any Format (step 124) and Exit (step 126). If the operator chooses Exit (step 126), audit controller 21 ends Start Format Ticket process (step 128) and initiates Choose Menu Item step (step 70 of FIG. 6).

Referring to FIG. 10, if the operator chooses Reference File function (step 116 of FIG. 9), audit controller 21 initiates Reference File procedure (step 130) and requests that operator select the appropriate reference file by choosing the appropriate file name (step 132). The reference file contains values representing sample ticket information. The reference file provides sample ticket information for testing ticket format and for format file development. Audit controller 21 accesses the selected reference file from digital data storage 30 and inputs the selected reference file into its random access memory (step 134). Next, audit controller 21 reads the location file and displays the location information to the operator as part of the reference file (step 136). Audit controller 21 accepts new or changed values for the reference file from the operator within the predefined range of acceptable values (step 138 Edit Reference File). Once the operator has completed the entry of new or changed values, audit controller 21 saves the edited reference file to the hard drive storage 30 (step 140). Audit controller 21 ends the Reference file procedure (step 142) and returns to Choose Menu Item step (step 114) of FIG. 9.

Referring to FIG. 11, if the operator chooses Format File function (step 118 of FIG. 9), audit controller 21 initiates Format File procedure (step 144) by accessing the user-selected format file and corresponding reference file (step 146).

The format file contains values representing information defining the organization of each transaction line and ticket for each type of device. In the preferred embodiment, for example, each text line of a transaction receives a unique identifier such as, ITEM LINE. Each line contains one or more fields and each field is defined by a name, size, offset and type. For example, an line which lists each item a customer purchases may be called ITEM LINE and contain a field called PRICE with a size of six characters (representing 000.00 dollar amounts), offset from the zero character in the line by 50 characters and a numeric type. Additionally, fields may be defined to include data such as price, number of items, text description of an item, time (such as military time), date, fixed text, which may be a field for messages to customers such as "Have a nice day!"

The format file also provides information defining the organization of search information. In the preferred embodiment, the search information, such as, device number, digital storage location of the device file and a list of fields for each line that can be searched, is stored in a predefined header. Use of a predefined header minimizes the time and resources required to search all transactions for the desired transactions.

Once the operator identifies the name of the format file, audit controller 21 accesses the selected format file from digital data storage 30 and inputs the selected format file into its random access memory (step 148). Next, audit controller 21 accesses the user-selected format file and corresponding reference file (step 150). Audit controller 21 displays the values of the format file to the operator and accepts new or changed values for current format file values from the operator within the predefined range of acceptable values (step 152 Edit Format File). Once the operator has completed the entry of new or changed values, audit controller 21 saves the edited format file to the hard drive storage 30 (step 154). Audit controller 21 ends the Format File procedure (step 156) and returns to Choose Menu Item step (step 114) of FIG. 9.

Referring to FIG. 12, if the operator chooses Header Format function (step 120 of FIG. 9), audit controller 21 initiates Header Format procedure (step 160) by accessing the user-selected format file (step 162). The header format is part of the format file and contains information for the organization of search information. In addition, the header format identifies the beginning of each transaction and thus is used in delineating transactions for audit purposes. Once the operator selects the desire format file, audit controller 21 accesses the selected header format from format file in digital data storage 30 and inputs the selected header format file into its random access memory (step 164).

Next, audit controller 21 accesses the corresponding reference file (step 166). Audit controller 21 displays the values of the header format file to the operator on the monitor 34 and accepts new or changed values for current header format file values from the operator within a predefined range of acceptable values (step 168 Edit Header Format File). Once the operator has completed the entry of new or changed values, audit controller 21 saves the edited format file to the hard drive storage 30 (step 170). Audit controller 21 ends the Format File procedure (step 172) and returns to Choose Menu Item step (step 114) of FIG. 9.

Referring to FIG. 9, if the operator chooses the Test Reference Format procedure (step 122 of FIG. 9), audit controller 21 inputs the values from one or more user-selected transactions into the reference format and displays the values on the monitor 34 in the user-defined reference format. The operator then visually checks the displayed values for accuracy. If the displayed values are not accurately formatted on the monitor 34, operator returns to Choose Menu Item (step 114) and then may select Reference File (step 116) to edit the reference file format to display transaction values accurately.

Referring to FIG. 9, if the operator chooses the Test Any Format procedure (step 124 of FIG. 9), audit controller 21 inputs the values corresponding to a user-selected format and displays the values on the monitor 34 in the user-selected format. The user-selected format may be a reference file format, a format file or a header format file. The operator then visually checks the displayed values for accuracy. If the displayed values are not accurately formatted on the monitor 34, operator returns to Choose Menu Item (step 114) and then may select Reference File procedure (step 116), Format File procedure (step 118) or Header Format procedure (120) to edit the selected format to display values accurately.

Referring to FIG. 6, if the operator chooses the Print Error File procedure (step 78), audit controller 21 prints the values stored on an error file to an output device, such as a printer. The error file contains values representing information about problems encountered in performing Communications (step 60 of FIG. 5). In the preferred embodiment, for example, the error file may indicate that a telephone transmission line signal disappeared while data was being transferred between audit controller 21 and a remote computer system, such as system controller 18, with a message such as "No carrier." Once the error file is printed, audit controller 21 returns to Choose Menu Item (step 70) and waits for the operator to select the next procedure.

If the operator chooses the View Error File procedure (step 80 of FIG. 6), audit controller 21 displays the values stored on an error file to the monitor 34. Once the error file has been displayed, audit controller 21 returns to Choose Menu Item (step 70) and waits for the operator to select the next procedure.

Referring to FIG. 6, if the operator chooses the Delete Error File procedure (step 82), audit controller 21 deletes the error file from digital data storage 30, returns to Choose Menu Item (step 70) and waits for the operator to select the next procedure.

If the operator chose the Clipboard procedure (step 84 of FIG. 6), audit controller 21 displays clipboard information on the monitor 34. Clipboard information contains values representing the latest information which an operator has requested to be moved to the clipboard. The clipboard provides volatile memory storage for information as such information is edited. Once the clipboard information is displayed, audit controller 21 waits for the operator to edit or delete clipboard information. Once the operator has finished with clipboard information, audit controller 21 returns to Choose Menu Item (step 70) and waits for the operator to select the next procedure.

Figure 13:
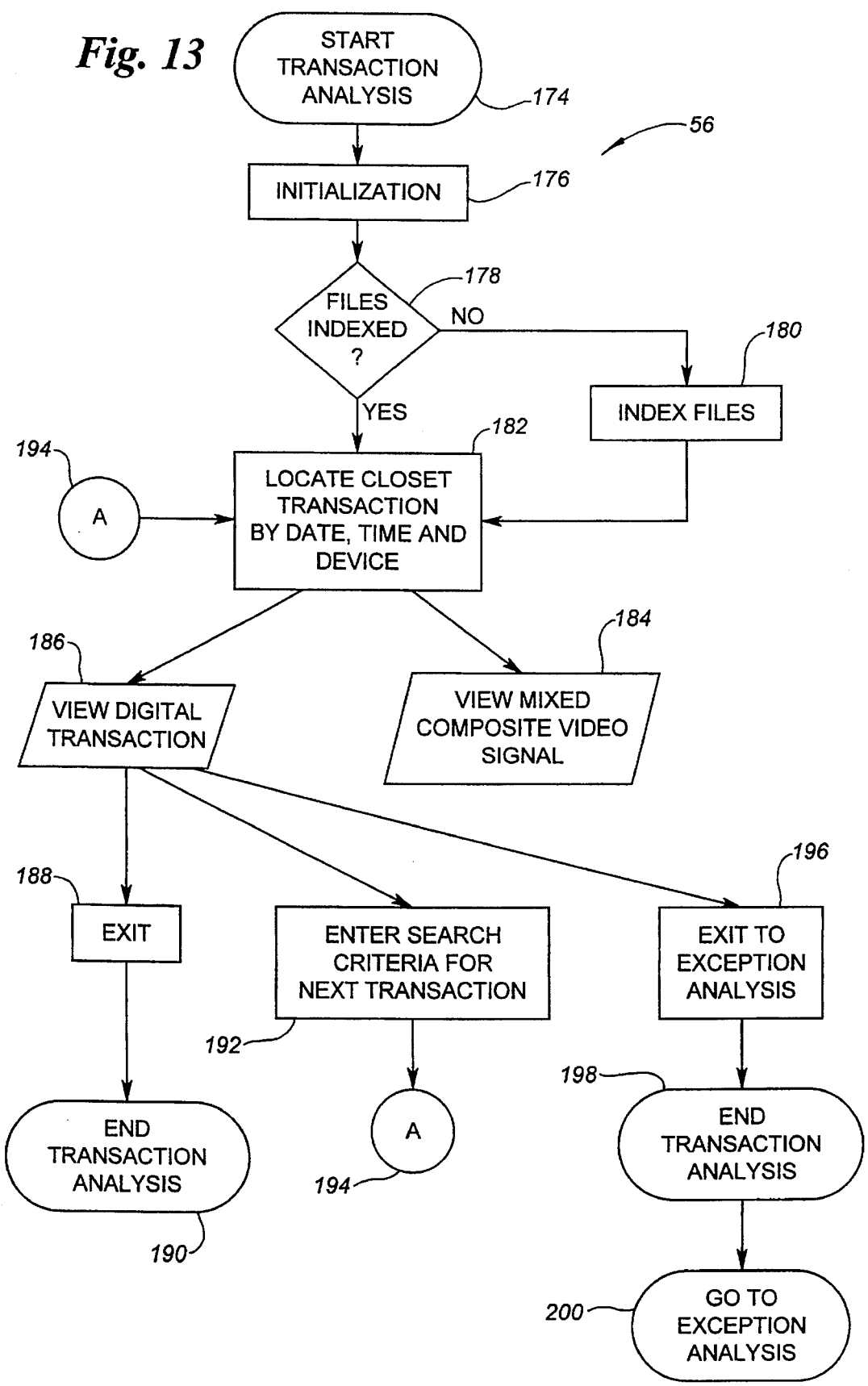
FIG. 13 shows the Transaction Analysis step of FIG. 5 in greater detail.

Referring to FIG. 13, audit controller 21 starts Transaction Analysis (step 56 of FIG. 5) by initializing the VCR 22 with the current system pointer and information about the transactions and files to be analyzed (steps 174, 176). Next, audit controller 21 tests whether or not the transaction files have been indexed (step 178). If the transaction files have not been indexed, audit controller 21 creates an index for each file and stores the index at the end of the file (step 180).

An index file contains values representing storage information for each transaction. In the preferred embodiment, each record in the index includes identifying information for the device which generated the digital transaction, the camera which recorded the transaction, the digital data storage location of the digital transaction file, video storage location (e.g. which videotape 19) and system pointer for the date and time that the transaction occurred. An index file provides key information to correlate the digital transaction information with the corresponding mixed composite video signal which represents a visual record of the transaction with transaction information incorporated into the video signal.

Once the transaction files are indexed, audit controller 21 locates the closest transaction to the current date and time by matching, as nearly as possible, the date and time of each transaction in the file from the selected device to the current date, time and selected device (step 182). Audit controller 21 scans the index file for transactions recorded from the selected device to locate the closest transaction.

Once the closest transaction is identified, audit controller 21 sends the date and time data from the transaction header information to VCR 22. VCR 22 uses its own internal function to retrieve and display that portion of the stored mixed composite video signal corresponding to the desired system date and time of the desired transaction (step 184). The video signal is displayed on video display 23.

Audit controller 21 formats the transaction file entries according to the information stored in the corresponding format file and displays the transaction on the monitor 34 (step 186).

Audit controller 21 then initiates the next procedure chosen by the operator. The operator indicates which procedure to initiate by entering the criteria for the next desired transaction, exiting to Exception Analysis or exiting Transaction Analysis (steps 188, 192, 196). If the operator exits Transaction Analysis (step 188), audit controller 21 ends Transaction Analysis (step 190) and returns to Choose Module (step 52 of FIG. 5). Once Transaction Analysis (step 56 of FIG. 5) is initiated from Exception Analysis, audit controller 21 automatically displays that portion of the stored mixed composite video signal corresponding to the particular transaction that was last reviewed in Exception Analysis (step 58 of FIG. 5).

If operator enters new search criteria i.e. information about the next transaction to view (step 194), audit controller 21 then returns to locate the desired transaction (steps 192, 194, 182). In the preferred embodiment, search criteria may include only particular transactions, such as voids. The search criteria may include only void transactions occurring at a particular device or occurring when any device is run by a particular operator. Those skilled in the art will understand that the individual search criteria can be combined in any number of operations using the relational operators AND, OR, NOR, NOT and numeric operators >, greater than, , less than and = equal to.

If operator chooses to Exit to Exception Analysis (step 196), audit controller 21 ends Transaction Analysis (step 198) and initiates Exception Analysis (steps 200 and step 58 of FIG. 5).

Figure 14:
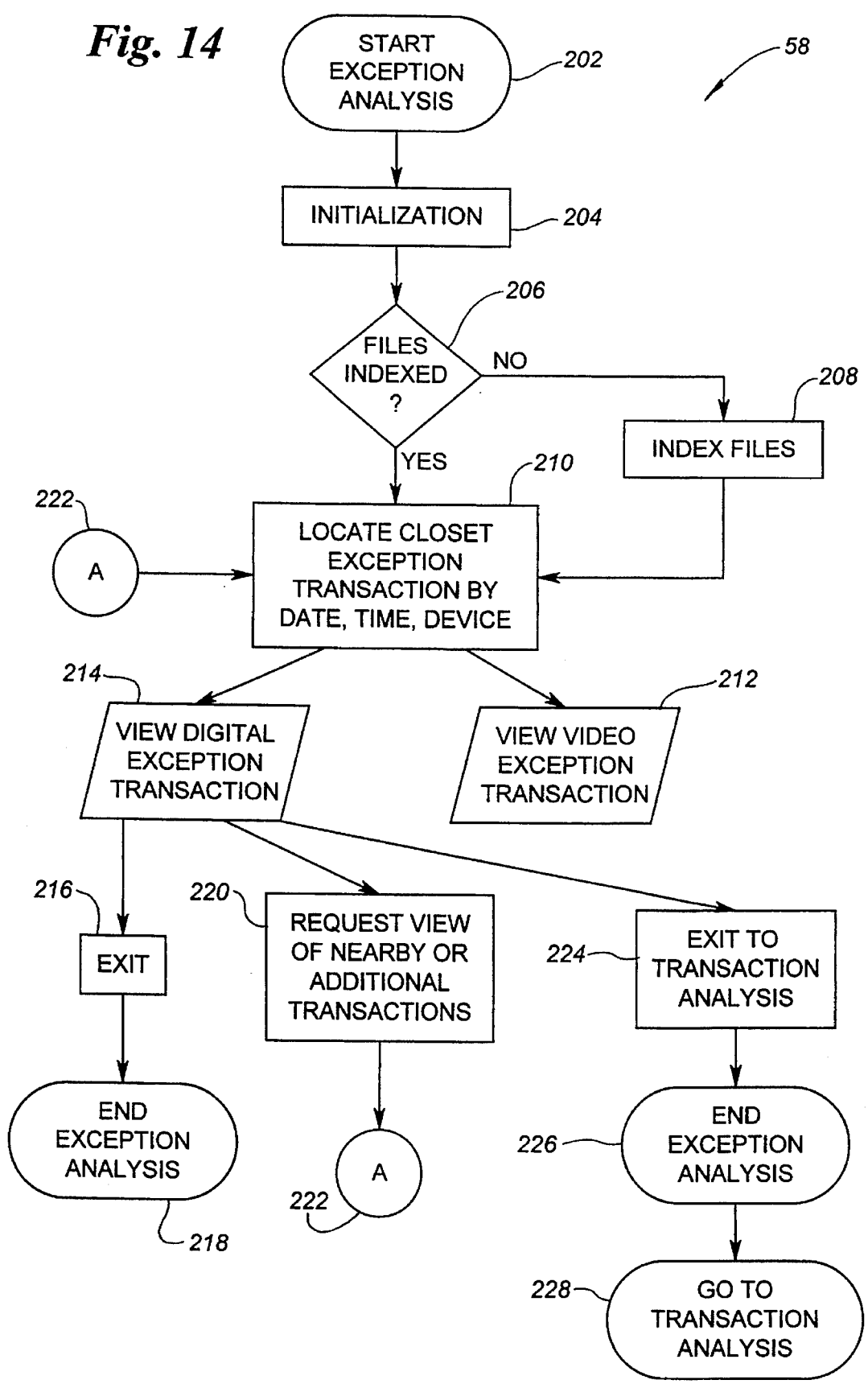
FIG. 14 shows the Exception Analysis step of FIG. 5 in greater detail.

Referring to FIG. 14, audit controller 21 starts Exception Analysis (step 58 of FIG. 5) initializing the VCR 22 with the current system pointer and information about the transactions and files to be analyzed (steps 202, 204). In the preferred embodiment, exceptions are defined by the user and often include void transactions, transactions with a dollar amount above or below predetermined limits and other transactions that may indicate employee pilfering or theft.

Next, similar to steps 178, 180, 182 of FIG. 13, audit controller 21 tests whether or not the transaction files have been indexed (step 206). If the transaction files have not been indexed, system controller creates an index for each file and stores the index at the end of the file (step 208). Once the transaction files are indexed, audit controller 21 locates the closest transaction to the current date and time by matching, as nearly as possible, the date and time of each transaction in the file from the selected device to the current date, time and selected device (step 210). Audit controller 21 scans the index file for transactions recorded from the selected device to locate the closest transaction.

Once the closest transaction is identified, audit controller 21 sends the date and time data from the transaction header information to VCR 22. VCR 22 uses its own internal function to retrieve and display that portion of the stored mixed composite video signal corresponding to the desired system date and time of the desired transaction (step 221). The video signal is displayed on video display 23.

Audit controller 21 formats the digital transaction file entries according to the information stored in the corresponding format file and displays the digital transaction on the monitor 34 (step 214).

Audit controller 21 then initiates the next procedure chosen by the operator. Operator indicates which procedure to initiate by entering the search criteria for the next desired transaction, exiting Exception Analysis or exiting to Transaction Analysis (steps 220, 216, 224). If the operator exits Exception Analysis (step 216), audit controller 21 ends Exception Analysis (step 218) and returns to Choose Module (step 52 of FIG. 5).

If operator enters new search criteria (step 220), similar to step 192 of FIG. 13, audit controller 21 then returns to locate the desired transaction (steps 220, 222, 210).

If operator chooses to Exit to Transaction Analysis (step 224), audit controller 21 ends Exception Analysis (step 226) and initiates Transaction Analysis (steps 228 and step 56 of FIG. 5).

Figure 15:
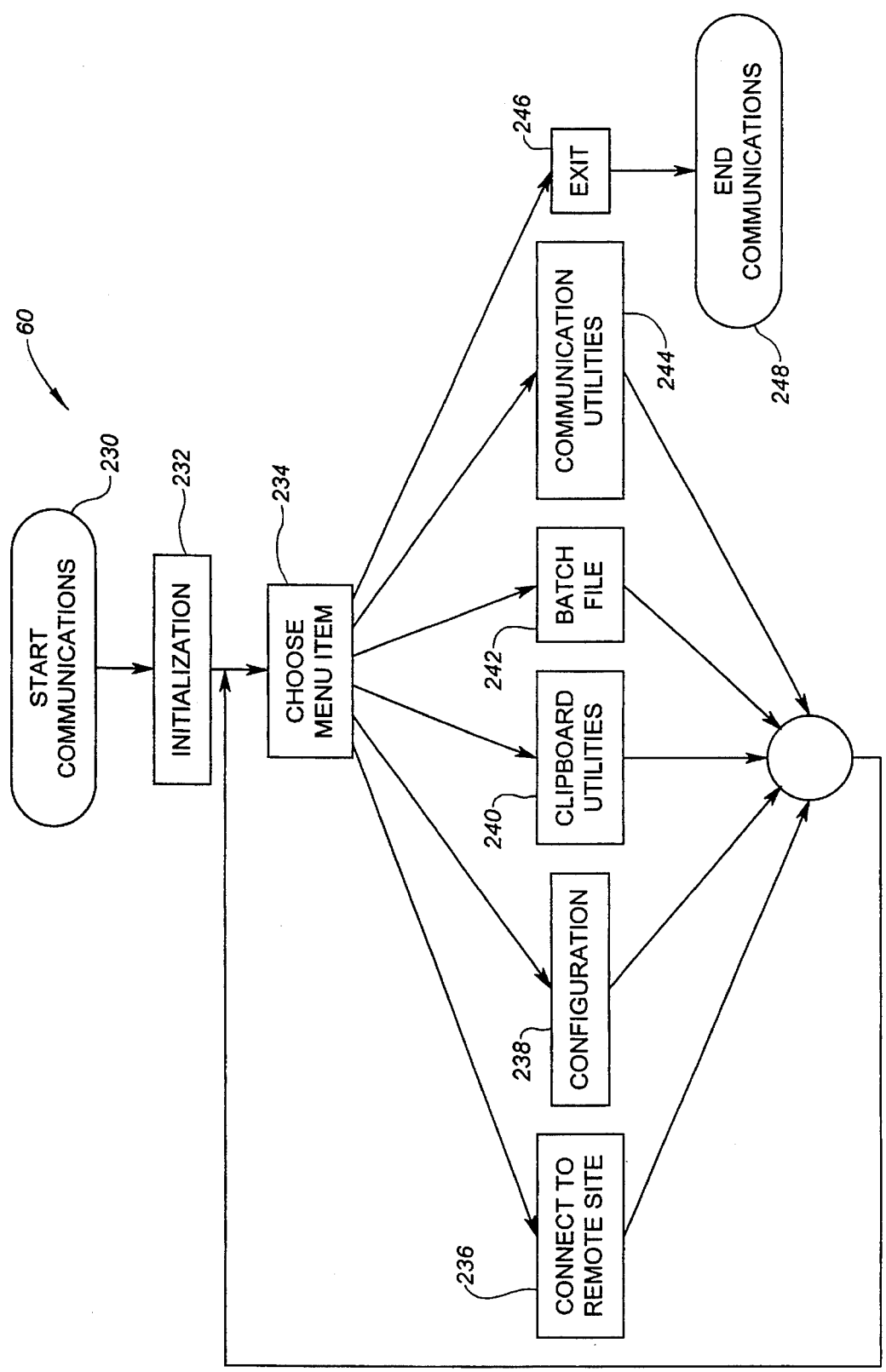
FIG. 15 shows the Communications step of FIG. 5 in greater detail.

Referring to FIG. 15, audit controller 21 starts Communication (step 60 of FIG. 5) and initializes the Communication procedure by identifying the files to be transferred so audit functions can be performed (steps 230, 232). Next, audit controller 21 asks the operator to input their choice of Communications functions to perform (step 234 Choose Menu Item). The choice of functions includes, at least, the following: Connect to Remote Site (step 236), Configuration (step 238), Clipboard Utilities (step 240), Batch File (step 242), Communication Utilities (step 244) and Exit (step 246). If the operator chooses Exit (step 246), audit controller 21 ends Communications process (step 248) and initiates Choose Module step (step 52 of FIG. 5).

If the operator chooses Connect to Remote Site (step 236), audit controller 21 accesses the location files for the location to which the operator wishes to transfer data, initiates the connection with the remote computer system and records any errors as the selected files are transferred. In the preferred embodiment, the remote computer system is system controller 18. It will be understood that once the remote connection is made, the operator may also view, archive, purge or monitor the transaction activity of the remote computer system.

If the operator chooses Configuration (step 238), audit controller 21 can configure the archival directory for the transferred files, can specify purging priorities such as purge only exception files, and can upload desired files from the remote computer system, such as system controller 18, to audit controller 21.

If operator chooses Clipboard Utilities (step 240), audit controller 21 can configure how the clipboard stores and manages information.

If operator chooses Batch File (step 242), audit controller 21 accesses user-defined batch files. Batch files include instructions to audit controller 21 for executing batch commands to perform communications functions.

If operator chooses Communication Utilities (step 244), audit controller 21 can create and edit batch files, edit the location file and edit the modem command line as desired to manage remote communications.

Figure 16:
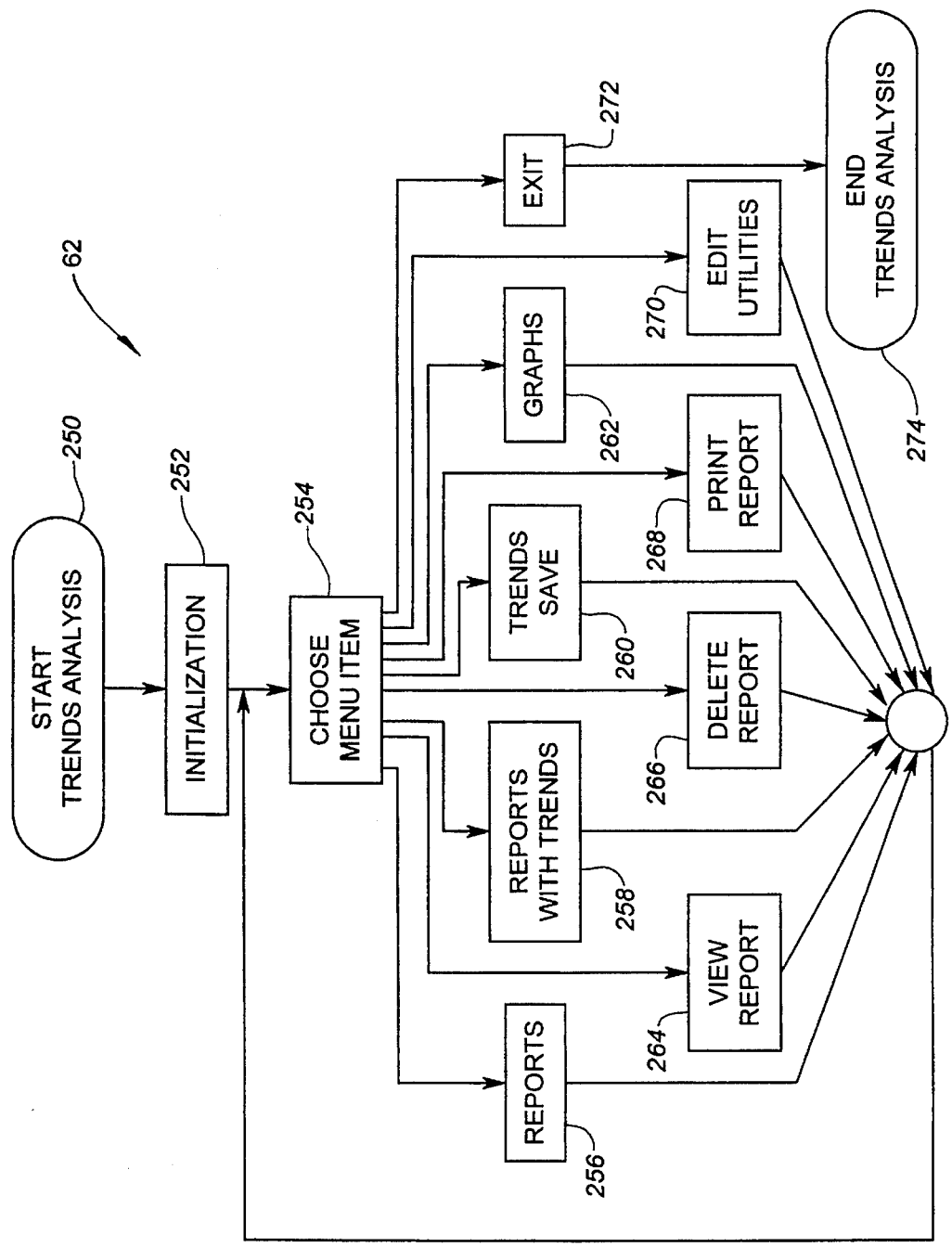
FIG. 16 shows the Trends Analysis step of FIG. 5 in greater detail.

Referring to FIG. 16, audit controller 21 starts Trends Analysis (step 62 of FIG. 5) and initializes the Trends Analysis procedure by initializing the VCR 22 with the current system pointer and information about the transactions and files to be analyzed (steps 250, 252). Trends Analysis collects transaction data and groups similar data together to produce totals, averages and percentages for analysis purposes. For example, a store manager may wonder what is the average dollar amount for voided transactions. Trends Analysis can correlate all the transaction data for a given period to, for example, determine the average dollar amount for all voided transactions in the month of May.

Next, audit controller 21 asks by asking the operator to input a choice of Trends Analysis functions to perform (step 254 Choose Menu Item). The choice of functions includes, at least, the following: Reports (step 256), Reports with Trends (step 258), Trends Save (step 260), Graphs (step 262), View Report (step 264), Delete Report (step 266), Print Report (step 268), Edit Utilities (step 270) and Exit (step 272). If the operator chooses Exit (step 272), audit controller 21 ends Trends Analysis process (step 274) and initiates Choose Module step (step 52 of FIG. 5).

If the operator chooses Reports (step 256), audit controller 21 accesses the report form file. A report form file contains information to automatically select predefined files and predefined parameters to generate a desired report. The Report form file references the format file for data conversion, the location file for data selection and the trends file and report output file for results from the reports. In the preferred embodiment, a template file defines the format of a report output file. The template file includes information defining, at least, the text, headings and column definitions for printing or displaying the reports.

After accessing all the data, audit controller 21 generates the report to the report output file and writes the report output file. The report output file holds the results for a report. The operator selects the output device for the report output file. depending on the operator's selection, audit controller 21 writes the report output file to a file on the digital data storage 30 or printer or displays them on the monitor 34.

If the operator chooses Reports with Trends (step 258), audit controller 21 performs the same steps as in Reports (step 256) and also generates a separate compilation of data to indicate trends. Trends accumulate report data over time to show long term changes. The trends file holds the results for a trend report. If operator chooses Trends Save (step 260 of FIG. 16), audit controller 21 saves the trends to the trends file on the hard drive storage 30 and returns to Choose Menu Item step (step 254).

If operator chooses Graphs (step 262), audit controller 21 initializes Graphs procedure by initializing the VCR 22 operably coupled to audit controller 21 with the current system pointer and by accessing information about the last transactions and files the operator accessed. Audit controller 21 compiles the data in the selected transaction and report files to produce various graphs. In the preferred embodiment, bar graph uses user-defined scales and the pointer indicating graph includes references to specific transactions falling outside user-defined limits. In the preferred embodiment, audit controller 21 can display specific transactions on the video display 23 from the VCR 22 upon operator's request.

If the operator chooses the View Report procedure (step 264 of FIG. 16), audit controller 21 displays the values stored in a user-selected report file to the monitor 34. Once the report file has been displayed, audit controller 21 returns to Choose Menu Item (step 254) and waits for the operator to select the next procedure.

Referring to FIG. 16, if the operator chooses the Delete Report procedure (step 266), audit controller 21 deletes ta user-selected report file from digital data storage 30, returns to Choose Menu Item (step 254) and waits for the operator to select the next procedure.

If the operator chooses the Print Report procedure (step 268 of FIG. 16), audit controller 21 prints the values stored on a user-selected report file to an output device, such as a printer. Once the report file is printed, audit controller 21 returns to Choose Menu Item (step 254) and waits for the operator to select the next procedure.

If the operator chooses the Edit Utilities procedure (step 270 of FIG. 16), audit controller 21 accesses either the report form file or template file, whichever the operator chooses, and allows the operator to alter and add to these files. Once the operator has completed the desired functions within the Edit Utilities, audit controller 21 returns to Choose Menu Item (step 254) and waits for the operator to select the next procedure.

What is claimed is:

1. A multimedia capture and audit system comprising:

a video surveillance network that monitors a plurality of electronic devices, each of which produce digital transaction data representative of each of one or more physical transactions registered by the electronic device, by using one or more video cameras to generate video signals monitoring the electronic devices;

node means for capturing a plurality of occurrences of digital transaction data from each of the plurality of electronic devices;

first memory means for storing the video signals;

second memory means separate from the first memory means for storing the digital transaction data as part of a database;

control means, operably coupled to the node means and the first and second memory means, for storing, in response to an occurrence of any of the plurality of occurrences of digital transaction data, a mixed composite video signal on the first memory means using a unique system pointer and for storing each of the plurality of occurrences of the digital transaction data and the unique system pointer in the database on the second memory means, the mixed composite video signal comprising a video overlay signal representative of each of the occurrences of the digital transaction data and a video signal of a corresponding physical transaction occurring at the electronic device concurrent with each occurrence represented by the digital transaction data; and audit means operably coupled to the first and second memory means for auditing the physical transactions registered by the electronic devices by subsequently analyzing the database to identify a user-defined suspect occurrence of the digital transaction data and reviewing the video signal of the corresponding physical transaction stored on the first memory means by using the unique system pointer stored in the database on the second memory means to access a corresponding unique system pointer indicating the suspect occurrence of the digital transaction data stored in the mixed composite video signal stored on the first memory means.

2. A multimedia capture and audit system of claim 1 wherein the first memory means is a videocassette recorder and videotape.

3. A multimedia capture and audit system of claim 1 wherein the second memory means is a digital hard disk.

4. A multimedia capture and audit system of claim 1 wherein the control means includes a processor for processing information and a video interface operably coupled to the processor for managing video signals to be stored on the first memory means.

5. A multimedia capture and audit system of claim 1 wherein said video interface includes a plurality of video cards for processing the mixed composite video signal.

6. A multimedia capture and audit system of claim 1 wherein said audit means includes a processor for processing information, a video controller and video display operably coupled to said processor for displaying a video signal retrieved from the first memory means, a monitor operably coupled to said processor for displaying information and a user input device operably coupled to said processor for inputting information to said processor for action.

7. A multimedia capture and audit method for a video surveillance network that monitors a plurality of electronic devices, each of which produce digital transaction data representative of each of one or more physical transactions registered by the electronic device, by using one or more video cameras to generate video signals representative of the physical transactions, the method comprising steps of:

(a) storing the video signals on a first memory storage device;

(b) for each occurrence of digital transaction data on one of the plurality of electronic devices, storing a mixed composite video signal on the first memory storage device using a unique system pointer and storing each occurrence of the digital transaction data and the unique system pointer in a database on a second memory storage device, the mixed composite video signal comprising a video overlay signal representative of each occurrence of the digital transaction data and a video signal of a corresponding physical transaction occurring at the electronic device and represented by the digital transaction data; and (c) auditing the physical transactions registered by the electronic devices by subsequently analyzing the database to identify a suspect occurrence of the digital transaction data and reviewing the video signal of the corresponding physical transaction on a single display means using the unique system pointer stored in the database on the second memory storage device to access a corresponding unique system pointer indicating the suspect occurrence of the digital transaction data stored in the mixed composite video signal recorded on the first memory storage device.

8. The method of claim 7 wherein step (c) further comprises the steps of:

(c1) requesting and storing operator defined search criteria to identify the suspect occurrence of the digital transaction data stored in the database;

(c2) searching the database for occurrence of the digital transaction data which matches the defined search criteria;

(c3) displaying the occurrence of the digital transaction data which matches the defined search criteria;

(c4) identifying the unique system pointer for the matching occurrence of the digital transaction data;

(c5) retrieving the mixed composite video signal recorded on the first memory storage device corresponding to the unique system pointer for the matching occurrence of the digital transaction data; and (c6) displaying the mixed composite video signal retrieved in step (c5) on the single display means.

9. The method of claim 7 wherein step (b) comprises the steps of:

(b1) capturing each occurrence of the digital transaction data from each of the plurality of electronic devices in a first data format native to the electronic device;

(b2) converting each occurrence of the digital transaction data to a second data format that includes a data field identifying the electronic device from which the digital transaction data was captured;

(b3) using each occurrence of the digital transaction data in the second data format to produce the overlay video signal representative of each occurrence of the digital transaction data;

(b4) using the data field in the second data format to identify the video signal of the physical transaction represented by each occurrence of the digital transaction data;

(b5) mixing the video signal identified in step (b3) with the overlay video signal identified in step (b4) to produce the mixed composite video signal;

(b6) recording the mixed composite video signal on the first memory storage device using the unique system pointer to identify the recording of the mixed composite video signal for each occurrence of the digital transaction data; and (b7) storing each occurrence of the digital transaction data in a third data format in the database stored on the second memory storage device, the third data format including a data field for storing the unique system pointer used in step (b6).

10. The method of claim 9 wherein step (b5) further comprises the step of:

creating said unique system pointer from a date and time stamp representative of the current date and time.

* * * * *